United States Patent [19]
Tatian et al.

[11] 4,198,125
[45] Apr. 15, 1980

[54] METHOD AND APPARATUS FOR OBTAINING THE DOPPLER TRANSFORM OF A SIGNAL

[75] Inventors: Berge Tatian, Stoneham; Richard H. Hudgin, Newton; Peter Nisenson, Burlington, all of Mass.

[73] Assignee: Itek Corporation, Lexington, Mass.

[21] Appl. No.: 826,804

[22] Filed: Aug. 22, 1977

[51] Int. Cl.$^2$ .................. G06G 9/00; G02B 27/00
[52] U.S. Cl. ..................... 350/162 SF; 350/3.74; 364/565; 364/822
[58] Field of Search .................. 343/8, 9, 10, 17; 340/3 M, 3 D; 350/162 SF, 3.74; 364/822, 565

[56] References Cited

U.S. PATENT DOCUMENTS

| | | | |
|---|---|---|---|
| 4,071,907 | 1/1978 | Casasent | 364/822 |
| 4,099,249 | 7/1978 | Casasent | 364/822 |
| 4,123,142 | 10/1978 | Fleming et al. | 350/162 SF |

*Primary Examiner*—Ronald J. Stern
*Attorney, Agent, or Firm*—Homer O. Blair; Robert L. Nathans; Gerald H. Glanzman

[57] ABSTRACT

Method and apparatus for obtaining the doppler transform of a one-dimensional linear signal by re-arranging the signal into a two-dimensional raster form image pattern and then obtaining an optical linear transformation of the two-dimensional image. An optical circuit is provided for carrying out the transformation and is designed to process the signal for a large number of doppler levels in rapid succession without it being necessary to rescan the initial signal each time as in the prior art. Accordingly, a substantial reduction in processing time is achieved.

The invention has been developed primarily for use in locating the position of underwater objects through the use of sonar, but has application in a variety of other data processing fields.

12 Claims, 1 Drawing Figure

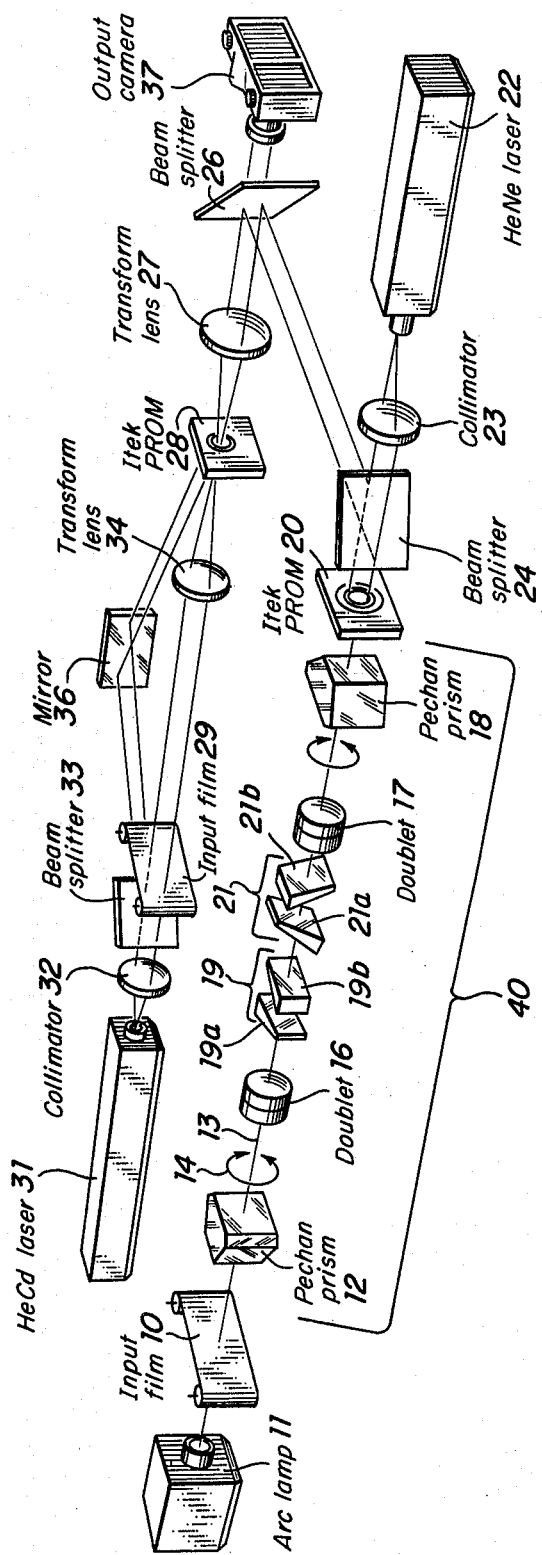

METHOD AND APPARATUS FOR OBTAINING THE DOPPLER TRANSFORM OF A SIGNAL

BACKGROUND OF THE INVENTION

1. Field of the Invention

The present invention relates generally to the field of optical signal processing, and, more particularly, to a method and apparatus for obtaining the doppler transform of a one-dimensional signal by re-writing the signal into a two-dimensional raster form image pattern and thereafter subjecting the two-dimensional image to an optical linear transformation.

2. Description of the Prior Art

Triangulation is a procedure commonly used to locate accurately the position of an object of interest by means of bearings from two fixed points a known distance apart. It is further known that this procedure can be used to locate the position of an underwater object through the use of sonar. Specifically, a sonar signal containing information indicative of an object of interest received by a first hydrophone array positioned at a known location can be correlated with a reference signal received by a second array a known distance from the first array to provide information regarding the position of the object.

When the object of interest is a moving object such as a ship or the like, the obtaining of accurate positional information is complicated by the fact that it further becomes necessary to correct the signal for doppler shift. If the velocity of the moving object is known, this can be accomplished fairly easily. However, when the velocity is not known, it becomes necessary to carry out what is essentially a trial and error procedure to ascertain the precise magnitude of the doppler shift by which the signal must be corrected. Specifically, the sonar signal, which is in the form of a long linear trace, is processed for a large number of different dopper levels, for example, 3,000 or more, and each of these doppler compensated signals is then examined and analyzed to ascertain the proper one.

In carrying out this procedure it is necessary to doppler transform the signal by stretching or contracting it for each of the levels, and then record each transformed signal for evaluation.

SUMMARY OF THE PREFERRED EMBODIMENTS

In accordance with the present invention, a method and apparatus is provided by which the processing of a signal for many different doppler levels can be carried out more quickly and efficiently than heretofore.

Specifically, in accordance with the present invention, it has been found that the doppler transform of a linear sonar signal (obtained in the prior art by subjecting the linear signal to a variable stretching or contraction) can be obtained equivalently by re-writing the signal into a two-dimensional raster form image pattern and then subjecting the entire two-dimensional image to an optical linear transformation. As will be explained in detail hereinafter, the particular linear transformation required consists of subjecting the image to a horizontal stretch (or contraction) together with a suitable horizontal shear and an optical circuit for accomplishing this is provided. Furthermore, the circuit is designed to permit the single two-dimensional image to be processed for many different doppler levels in rapid succession without it being necessary to re-write the image for each doppler level. This permits a significant reduction in processing time and greatly simplifies the entire correlation operation.

Specific details of the invention will be set out hereinafter in conjunction with the detailed description of the preferred embodiment.

BRIEF DESCRIPTION OF THE DRAWING

The FIGURE illustrates, in somewhat schematic form, an optical circuit for correlating sonar signals according to a presently most preferred embodiment of the invention.

DETAILED DESCRIPTION OF THE PREFERRED EMBODIMENT

Because the present invention was developed primarily for use in processing sonar signals to assist in locating the position of an underwater object of interest, the following description of the preferred embodiment describes the invention within this environment. It should be understood, however, that it is not intended to limit the invention to this particular application as it could readily be employed in a variety of other signal processing areas.

Let us assume that we have a sonar signal which contains information relating to the presence and position of an underwater object of interest. In practice, this signal will be a long linear signal obtained by summing all of the signals received by a linear array of hydrophones utilizing well-known beam-forming techniques which do not form a part of the present invention.

As mentioned previously, in order to find the position of the object of interest, it is necessary to correlate this signal with a reference signal received from a second set of hydrophones, and, if the object of interest is a moving object, it is further necessary to doppler correct the signal prior to the correlation to compensate for the movement of the object. As also mentioned previously, when the velocity of the object is not known, the doppler correction required will also not be known, and it becomes necessary to process the signal for many different doppler levels (e.g., 3,000) and then analyze and evaluate each of these 3,000 doppler shifted signals to ascertain the correct one. In the prior art, this has necessitated that the initial linear signal be rescanned 3,000 times and subjected to a variable stretching or contraction to generate the 3,000 different signals for analysis.

The present invention avoids this very time consuming procedure by first rearranging the linear signal into a two-dimensional square raster format and then imaging this pattern onto a suitable recording medium. This image pattern is then subjected to an optical linear transformation that is equivalent to the doppler transformation applied to the initial linear signal. Specifically:

let f(t) = the one-dimensional signal.
let F(x,y) = the two-dimensional raster scan of the one-dimensional signal.
F(x,y) is thus defined as follows:

$$F(x,y) = f(x/v + yT/d) \tag{1}$$

where
T = the duration in time of the signal recorded on one line of the raster,
v = the velocity of scan in the x direction,
d = the space between each line in the raster, and y = the y position in integer multiples of line space d.

Now, a doppler shift consists of scaling time by a factor "a" to produce a new one-dimensional signal f'(t) defined by $$f'(t) = f(at) \tag{2}$$

The corresponding two-dimensional raster pattern F' for the doppler shifted signal f' is given by substituting f' for f in equation (1) as follows:

$$F'(x,y) = f'(x/v + yT/d) \tag{3}$$

In terms of the original function f, the doppler shifted pattern F' becomes:

$$F'(x,y) = f(ax/v + ayT/d) \tag{4}$$

where equation (2) is used to write f' in terms of f.

F' can also be generated equivalently by using a two-dimensional linear transformation on F(x,y). Let new coordinates $\bar{x}, \bar{y}$ be defined in terms of the old coordinates x,y as follows:

$$\left. \begin{array}{l} \bar{x} = ax + \dfrac{(a-1)vyT}{d} \\ \bar{y} = y \end{array} \right\} \tag{5}$$

In the case of no doppler transform, a=1 and $\bar{x}$ and $\bar{y}$ are the same as x and y, but any doppler transform will change $\bar{x}$ and $\bar{y}$.

Imagine now an optical system that took every point x,y in one image plane and focused it onto a point $\bar{x},\bar{y}$ on a second image plane. Then an image I(x,y) would become an image $$\hat{I}(\bar{x},\bar{y}) = I(ax + ay, y) \tag{6}$$

This invention consists of an optical system that does this image-to-image mapping.

If the first image were F(x,y), then the second image becomes $\hat{F}(\bar{x},\bar{y})$ which is given by $$\hat{F}(\bar{x},\bar{y}) = F(ax + \dfrac{ay}{d}, y) \tag{7}$$

To see how to interpret this new image, we use the previous equation where F is expressed in terms of the signal f(t).

$$\hat{F}(\bar{x},\bar{y}) = f(\dfrac{ax}{v} + \dfrac{(a-1)yT}{d} + \dfrac{yT}{d}) \tag{8}$$

$$= f(\dfrac{ax}{v} + \dfrac{ayT}{d})$$

Since this is exactly the same expression we got when writing the doppler transformed signal f'(t) = f(at) in a raster pattern F'(x,y) (see equation 4), we have two equivalent ways of generating the same doppler transformed raster pattern, i.e.;

1. Doppler transform the original one-dimensional signal and rescan it in raster form; or
2. Perform an optical transform on the original raster scan to give the new raster pattern.

The second option is the heart of the present invention since it avoids the rescanning process which is quite slow.

The optical problem thus consists of imaging the square raster pattern onto a suitable image receiving medium subject to the transformation given by equations (5) above. The optical system for carrying out this transformation, and to be described hereinafter, was designed based on the fact that such a transformation can be resolved into a pair of anamorphic magnifications in mutually perpendicular directions and a rotation. The rotation can be obtained readily through use of a derotation prism such as a dove, reversion or pechan prism. Normally, a fixed amount of anamorphic magnification can be easily carried out by the use of cylindrical optics. However, to practice the present invention, a variable anamorphic device is needed to permit sequential processing of the image pattern for many doppler levels. This could be obtained by making use of a variable magnification, cylindrical Galilean telescope, however, this would require two independent axial motions of cylindrical components per telescope (one for magnification and one for focus) which could prove troublesome because of the tight distortion requirements of the system.

Accordingly, a presently preferred way to accomplish this is through the use of prism magnification. This would require a pair of simple prisms per anamorphic direction, both of which are rotatable about an axis perpendicular to the optic axis of the system. These prisms also have to be placed in collimated light to avoid aberrations. An optical circuit designed to satisfy the requirements set forth above is illustrated in the FIGURE.

Specifically, the initial linear signal has been re-written in a two-dimensional raster format and recorded as an image pattern on input film 10. This image pattern may, for example, conveniently comprise a square 1"×1" matrix consisting of 500 or more lines. This image is adapted to be illuminated by arc lamp 11, which, as will be explained hereinafter, is capable of being flashed very rapidly (i.e., 2,000 times per second).

The beam passing through the image pattern on film 10 first passes through a pechan type rotation prism 12 which is rotatable about the optic axis 13 (as by being mounted in a tube, for example) as indicated by arrow 14. The beam passing through film 10 is assumed to be F/10 at 440 nanometers and is collimated by the doublet lens 16 as shown. The parallel beam is decollimated by doublet lens 17 and rotated again by another pechan prism 18 to give unit magnification imagery (the second pechan prism is provided so that the anamorphic prism system does not have to be rotated about the optic axis also).

A pair of prism anamorphisors 19 and 21 are placed in the collimated light beam between the two doublets. The first prism set, made up of prisms 19a and 19b, magnifies (or demagnifies) in the horizontal direction while the second prism set, made up of prisms 21a and 21b, works in the vertical direction, where horizontal is defined as being parallel to the light direction between beam splitters 24 and 26 (to be described hereinafter). All four of the prisms 19a, 19b, 21a and 21b are independently rotated by any conventional means, not shown, about axes perpendicular to the optic axis 13. The combination of all six rotations, including pechan prisms 12 and 18, yields the transformation of equation (5).

The magnitudes of the motions of the various components to accomplish the required distortion are given by the following formulas.

First, the optical system used in this invention and described above, is a particular, convenient system to give a realization of the geometrical transformation:

$$\begin{bmatrix} x' \\ y' \end{bmatrix} = \begin{bmatrix} 1+M & S \\ 0 & 1 \end{bmatrix} \begin{bmatrix} x \\ y \end{bmatrix}$$

where M is a variable magnification in the x direction, and S is a variable shear in the x direction. For the purposes of this invention, S is continuously variable between −0.5 and +0.5, and M is given as a function of S by:

$$M = S/500$$

since the raster in our embodiment is made up of 500 lines. The optical realization of this transformation used here is to apply a sequence of optical transformations to the object consisting of:
1. a rotation about the optical axis through, an angle $2\phi$;
2. a cylindrical or one-dimensional magnification in the x direction by a factor k;
3. a cylindrical or one-dimensional magnification in the y direction by a factor j; and
4. a rotation about the optical axis through an angle $2\theta$.

The equations governing the transformations 1 through 4 above are given in terms of the shear parameter, S, by:

$$\tan 2(\theta-\phi) = 500$$

$$\tan 2(\theta+\phi) = (-S)/(2+S/500)$$

[i.e., $\theta - \phi = $ constant]

$$k = S/2 + \sqrt{1 + S/500 + S^2/4}$$

$$j = -S/2 + \sqrt{1 + S/500 + S^2/4}$$

The two rotations are obtained through the use of the pechan prisms, while the variable cylindrical magnifications are obtained by the pairs of prism animorphisors which rotate individually about axes perpendicular to the optic axis. It is to be noted, however, that these transformations could have been obtained by other optical means, which would be known to persons skilled in the field. For example, as mentioned above the variable cylindrical magnification could also be obtained using zoom telescopes utilizing cylindrical lenses. Also, the transformation could be obtained coherently with the use of gratings.

Each of the rotatable components will rotate at about 10 revolutions per second, and as they are rotating through one revolution, the arc lamp can be flashed 200 times to project 200 images representing 200 different optical linear transformation levels of the image pattern on input film 10, in turn, corresponding to 200 different doppler levels. Each of these doppler shifted images can then be recorded on a suitable storage medium 20 for later evaluation.

Preferably, storage medium 20 comprises a rapidly recyclable image storage device, and most preferably, it comprises a device known as the Itek PROM. This is a rapidly recyclable, electro-optic photosensitive storage device which exhibits persistent internal polarization and which has its conductance varied as a function of the radiation incident upon it and its birefringence varied as a function of the electric field applied across it.

The characteristics and operation of the Itek PROM are set out in substantial detail in U.S. Pat. No. 3,517,206 to D. S. Oliver and need not be discussed in great detail herein. Suffice it to say the Itek PROM includes a crystal wafer of, for example, $Bi_{12}SiO_{20}$ contained together with a dichroic reflector in a parylene insulating layer. Transparent electrodes are coated onto both faces of the insulating layer and are coupled to a battery or the like. When radiation to which the device is sensitive (e.g., blue light) is applied to it, the photosensitivity of the crystal wafer will cause its conductance to vary as a function of the intensity of the incident radiation. When the incident radiation is of relatively high intensity, the wafer will become highly conductive and the field across it imposed by the pair of electrodes will decrease substantially. When, on the other hand, the incident radiation is of relatively low intensity, the conductance of the wafer will be increased only slightly and the field across it will be decreased only slightly. From this if the intensity of the incident radiation varies from place to place over the surface of the wafer, the conductance of the wafer will also vary from place to place in like manner as will the electric field across the wafer and in this way an image can be effectively stored in the device as a modulation of the stored electric signal.

Once an image has been effectively stored in the device, it can be read out in red light by placing the device between cross polarizers and displaying the variations in birefringence proportional to the residual field in the wafer after exposure.

Referring back to the FIGURE, the series of doppler transformed image patterns of the input raster image is read into Itek PROM 20 and stored therein in rapid sequence. As each signal is read into the Itek PROM, it can be read out by illuminating the device with HeNe laser 22 through collimator 23 and beam splitter 24. The read out light beam containing the image that was stored within the Itek PROM is then directed via beam splitter 24, beam splitter 26 and fourier transform lens 27 onto a second Itek PROM 28 to read out the image stored in that device for purposes of correlating the doppler transformed signal from Itek PROM 20 with a reference signal recorded on input film 29. Specifically, as was discussed previously, the reference signal on input 29 comprises a composite signal obtained by summing the signals from a second linear array of hydrophones positioned a known distance from the first array. This reference signal has also been recorded on film 29 as a two-dimensional square raster image pattern for purposes of correlation. This reference signal pattern is illuminated by light from HeCd laser 31 via collimator 32 and beam splitter 33 and imaged onto Itek PROM 28 via fourier transform lens 34. A second portion of the beam from laser 31 is also projected onto Itek PROM 28 via beam splitter 33 and mirror 36 to interfere with the pattern recorded on Itek PROM from film 29. The pattern thus stored in Itek PROM 28 is what is known as a Vanderlugt filter which is a hologram of the fourier transformed image pattern.

The image pattern thus stored in Itek PROM 28 is read out by the fourier transform of the radiation pattern read out of Itek PROM 20. The output of Itek PROM 28 is thus the product of the two fourier transforms which pattern passes through transform lens 27 to obtain the inverse fourier transform, and is then recorded on output camera 37. Each of the 200 doppler transformed signals of the image pattern on input film 10 can thus be sequentially correlated with the reference signal recorded on input 29 and the correlations recorded on camera 37 for later analysis to ascertain the proper doppler correction for the signal on input 10.

The above correlation procedure and apparatus is described only briefly for completeness. A more detailed description is believed unnecessary as the procedure is generally conventional except as it is applied to the processing of two-dimensional image patterns according to the invention.

It should be pointed out here that the transformations defined by equations (1) and produced by the optical system of the FIGURE (i.e., portion 40 of the overall correlation circuit) does not produce a square format, but instead generates the doppler transformed signals in a parallelogram pattern. This means that a slight reduction in the amplitude of correlation will occur when this transformed pattern is matched with the square raster reference signal from input 29 since the corners of the parallelogram will have no signal to correlate with and will be lost. In practice this means a loss in signal to noise of no more than 1.2 db in the case of a 50% shift of the last line in the raster (i.e., a 75% overlap of the square and transformed parallelogram). Such a small loss in signal to noise is very acceptable in view of the advantages of the speed in this transformer.

In summary, the present invention provides a method and apparatus whereby a sonar signal can be processed for many doppler levels in rapid sequence without the need to rescan the signal each time. Only a relatively simple optical circuit is required to do this, and through the use of a rapidly recyclable storage device such as the Itek PROM, each of these doppler shifted signals can be rapidly correlated with a reference signal and the correlated signals recorded for later analysis.

While what has been described constitutes the presently most preferred embodiment of the invention, it should be understood that the invention may take other forms and, accordingly, the invention should be limited only insofar as required by the scope of the following claims.

We claim:
1. A method for obtaining the doppler transform of a one-dimensional signal comprising:
  (a) rearranging said one-dimensional signal in a two-dimensional raster image pattern format; and
  (b) producing a plurality of optical linear transforms of said two-dimensional image pattern, said step of producing a plurality of optical linear transforms comprising the steps of optically applying a plurality of horizontal stretches (or contractions) together with a plurality of horizontal shears to the two-dimensional image pattern.

2. A method as recited in claim 1 wherein said rearranging step comprises recording said one-dimensional signal in a square two-dimensional raster image pattern format.

3. A method as recited in claim 1 and further including the step of projecting each of said plurality of linear transforms of said image pattern on an image receiving medium.

4. A method as recited in claim 1 wherein said step of optically applying a plurality of horizontal stretches together with a plurality of horizontal shears comprise optically subjecting said two-dimensional image pattern to a plurality of pairs of anamorphic magnifications in mutually perpendicular directions and a rotation whereby said two-dimensional image pattern is linearly transformed to a large number of different transformation levels.

5. A method as recited in claim 4 and further including the step of recording said large number of transformation levels onto an image receiving medium in rapid sequence.

6. An apparatus for obtaining the doppler transform of a one-dimensional signal comprising:
  (a) means for recording said one-dimensional signal in a two-dimensional raster image pattern format;
  (b) means for producing a plurality of optical linear transforms of said recorded two-dimensional image, said means for producing said plurality of optical linear transforms comprising optical means for optically applying a plurality of horizontal stretches (or contractions) together with a plurality of horizontal shears to said recorded two-dimensional image; and
  (c) image receiving means for receiving each of said plurality of optical linear transforms.

7. Apparatus as recited in claim 6 wherein said means for applying said plurality of horizontal stretches together with said plurality of horizontal shears to said two-dimensional image comprises first optical means for subjecting said image pattern to a plurality of pairs of anamorphic magnifications in mutually perpendicular directions, and second optical means for subjecting said image pattern to a rotation.

8. Apparatus as recited in claim 7 wherein said first optical means comprises a pair of prism anamorphisors.

9. Apparatus as recited in claim 8 wherein said second optical means comprises derotation prism means.

10. Apparatus as recited in claim 8 wherein said prism anamorphisors are variably rotatable whereby said anamorphic magnifications may be varied to, in turn, linearly transform said two-dimensional image to a large number of different transformation levels.

11. Apparatus as recited in claim 10 wherein said means for receiving said plurality of linear transforms of said two-dimensional image comprises rapidly recyclable image storage means.

12. Apparatus as recited in claim 11 wherein said apparatus further includes means for illuminating said two-dimensional image, said illuminating means including means for flashing very rapidly whereby said large number of transformation levels may be recorded on said image storage means in rapid sequence.

* * * * *